US008843817B2

(12) United States Patent
Joshi (10) Patent No.: US 8,843,817 B2
(45) Date of Patent: Sep. 23, 2014

(54) SYSTEM AND METHOD FOR OBTAINING USER INFORMATION

(75) Inventor: Rekha Joshi, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 482 days.

(21) Appl. No.: 12/881,320

(22) Filed: Sep. 14, 2010

(65) Prior Publication Data

US 2012/0066579 A1 Mar. 15, 2012

(51) Int. Cl.
*G06F 17/22* (2006.01)
*G06Q 30/00* (2012.01)
*G06F 17/30* (2006.01)

(52) U.S. Cl.
CPC .............................. *G06F 17/30867* (2013.01)
USPC ........ 715/221; 715/224; 715/234; 705/14.49; 705/14.67

(58) Field of Classification Search
USPC ......... 715/200, 201, 204, 205, 210, 221, 224, 715/226, 234, 253, 254, 255, 256, 273, 700, 715/760, 780; 705/14.4, 14.49, 14.55, 705/14.66, 14.67
See application file for complete search history.

(56) References Cited

U.S. PATENT DOCUMENTS

| | | | | |
|---|---|---|---|---|
| 6,839,680 | B1 * | 1/2005 | Liu et al. ........................ | 705/7.33 |
| 7,269,590 | B2 * | 9/2007 | Hull et al. ...................... | 707/770 |
| 7,444,358 | B2 * | 10/2008 | Paczkowski et al. ................. | 1/1 |
| 7,734,632 | B2 * | 6/2010 | Wang ............................. | 707/749 |
| 7,809,740 | B2 * | 10/2010 | Chung et al. ................... | 707/758 |
| 8,024,317 | B2 * | 9/2011 | Nair et al. ...................... | 707/709 |
| 8,032,508 | B2 * | 10/2011 | Martinez et al. ............... | 345/745 |
| 8,060,463 | B1 * | 11/2011 | Spiegel .......................... | 707/609 |
| 2002/0054089 | A1 * | 5/2002 | Nicholas et al. ............... | 345/745 |
| 2003/0229629 | A1 * | 12/2003 | Jasinschi et al. .................. | 707/3 |
| 2007/0055656 | A1 * | 3/2007 | Tunstall-Pedoe ................. | 707/3 |
| 2007/0239735 | A1 * | 10/2007 | Glover et al. ................... | 707/10 |
| 2008/0119201 | A1 * | 5/2008 | Kolber et al. ............... | 455/456.1 |
| 2008/0184113 | A1 * | 7/2008 | Error ............................. | 715/700 |
| 2008/0201327 | A1 * | 8/2008 | Seth ................................. | 707/5 |
| 2009/0119259 | A1 * | 5/2009 | Williams et al. .................. | 707/3 |
| 2009/0327223 | A1 * | 12/2009 | Chakrabarti et al. ............. | 707/3 |
| 2009/0328087 | A1 * | 12/2009 | Higgins et al. .................. | 725/10 |
| 2010/0036819 | A1 * | 2/2010 | Carmichael et al. ............. | 707/3 |
| 2010/0063993 | A1 * | 3/2010 | Higgins et al. ................ | 709/203 |
| 2010/0125563 | A1 * | 5/2010 | Nair et al. ...................... | 707/709 |
| 2010/0262932 | A1 * | 10/2010 | Pan ............................... | 715/780 |

* cited by examiner

*Primary Examiner* — Maikhanh Nguyen
(74) *Attorney, Agent, or Firm* — Mauriel Kapouytian Woods LLP; Lana Akopyan (57) ABSTRACT

Embodiments presented herein provide methods, systems and computer program products for incentivizing users for providing user information. One method transmits data operative to cause a remote client application to render a structured form for input by a user. The structured form comprises one or more fields into which a user can input user attribute data. The method receives one or more user information objects including the user attribute data. The method accesses a data store of famous persons, comprising one or more famous person information objects each associated with a famous person, and including famous person attribute data. The method identifies one or more famous persons based on a matching of at least one of the user information objects and one or more famous person information objects. The method presents the identified famous persons and one or more aspects of associated famous person attribute data matching the user attribute data.

15 Claims, 8 Drawing Sheets

Find your Celebrity match

1. Tell us about yourself...

- My job: [          ]
- Birthdate: [Month ▼] [Date ▼] [Year ▼]
- ZIP Code: [          ]
- Studied at...: [          ]

*Upload your photograph*

2. What you like

- Food: [          ]
- Drinks: [          ]
- TV shows: [          ]
- Movies: [          ]
- Music: [          ]
- Movies: [          ]
- Clothes: [          ]
- Cars or motorcycles: [          ]
- Holiday destinations: [          ]

( Tell me my celebrity matches ) — 402

*FIG. 4A*   ↙ 400

Find your Celebrity match

1. Tell us about yourself...

My job  ☐

Birthdate  *Miranda Kerr is the same sun sign as you*

ZIP Code  ☐

Studied at...  ☐

<u>*Upload your photograph*</u>

2. What you like

Food  *John Travolta likes sushi like you do.*  [Update] ⌐ 412

Drinks  ☐

TV shows  ☐

Movies  ☐

Music  ☐

Movies  ☐

Clothes  ☐

Cars or motorcycles  ☐

Holiday destinations  ☐

[Reveal matches] ⌐ 414

SYSTEM AND METHOD FOR OBTAINING
USER INFORMATION

TECHNICAL FIELD

The present disclosure generally relates to targeted content provision, and more particularly to collection of user information.

BACKGROUND

The internet is a powerful tool for content providers to reach out to a large audience. The internet provides powerful targeted content provision methods such as contextual targeting, behavioral targeting, lifestyle targeting, demographic targeting, geographic targeting and the like. Targeted content provision methods enable content providers to reach out to the relevant audience. Through targeted content provision, content providers keep the interest in the target audience high, and effect higher return rates. Targeted content provision also enables marketers to improve their conversion rates, while keeping marketing costs in check.

Content providers perform behavioral targeting using website visitor navigation and content viewing patterns. Example software for gathering user behavioral statistics includes Google Analytics, Urchin Software from Google Inc., Yahoo! Web Analytics, and Omniture's Site Catalyst. Geographic targeting, also called geo-targeting or geo-marketing is the method of determining the geographic location (the physical location) of a website visitor and delivering different content to that visitor based on his or her location, such as country, region/state, city, metro code/zip code. The geographic location of the website visitor may be derived using information such as Internet Protocol (IP) address, Internet Service Provider (ISP), traceroute, and the like. Such information may be derived from click stream data, cookies, Hyper Text Transfer Protocol (HTTP) request headers, server traffic logs. However, such methods to determine the geographic location may be complex, computing intensive and often inaccurate.

Lifestyle and demographic targeting include obtaining user information, such as annual income, user's interests, objects that a user may own, and so forth. Lifestyle and demographic information may usually be obtained from the user directly, using online forms, and surveys. However, users may not always participate in such surveys. Some users may not wish to disclose their personal information at all, since there is no immediate incentive for providing the information. Also, users may not find it interesting to fill out online forms.

SUMMARY

In particular embodiments, the present invention provides methods, systems and computer program products for obtaining user information and incentivizing users for providing the user information. In one method, the method receives one or more user information objects at a server. The method then accesses a data store of famous persons. The data store comprises one or more famous person information objects associated with the famous persons. The method then identifies one or more famous persons based on a matching of the one or more user information objects and one or more famous person information objects. The method finally presents the identified famous persons and associated famous person information objects.

DETAILED DESCRIPTION

Various embodiments of the present invention will be described in detail below with reference to accompanying drawings. It will be apparent, however, that these embodiments may be practiced without some or all of these specific details. In other instances, well known process steps or elements have not been described in detail in order not to unnecessarily obscure the description of the invention. The following example embodiments and their aspects are described and illustrated in conjunction with apparatuses, methods, and systems which are meant to be illustrative examples, not limiting in scope.

Embodiments presented herein provide methods, systems and computer program products for incentivizing users for providing user information. One method transmits data operative to cause a remote client application to render a structured form for input by a user. The structured form comprises one or more fields into which a user can input user attribute data. The method receives one or more user information objects including the user attribute data. The method accesses a data store of famous persons, comprising one or more famous person information objects each associated with a famous person, and including famous person attribute data. The method identifies one or more famous persons based on a matching of at least one of the user information objects and one or more famous person information objects. The method presents the identified famous persons and one or more aspects of associated famous person attribute data matching the user attribute data.

Example Network Environment

Figure 1:
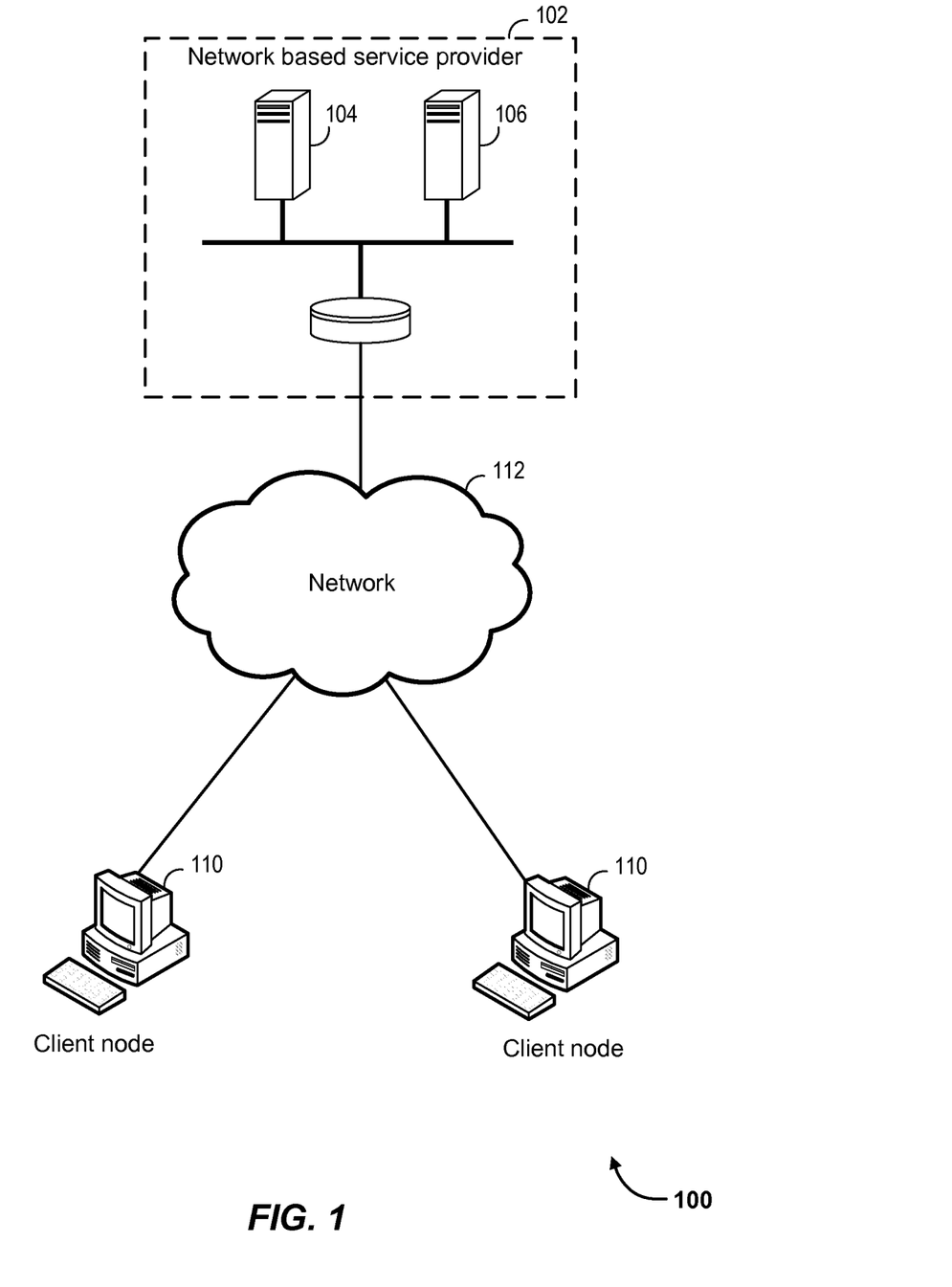
FIG. 1 illustrates an example network environment in which particular implementations may operate.

FIG. 1 illustrates an implementation of a network environment 100 in which particular implementations of the invention may be deployed according to one embodiment. Network environment 100 includes a network based service provider 102, one or more client nodes 110, and a network 112. Network based service provider 102 includes one or more application servers 108, and a profiling system 106. Network 112 generally represents one or more interconnected networks, over which network based service provider 102 and client nodes 110 can communicate with each other. Network 112 may include packet-based wide area networks (such as the Internet), local area networks (LAN), private networks, wireless networks, satellite networks, cellular networks, paging networks, and the like. A person skilled in the art will recognize that network 112 may also be a combination of more than one type of network. For example, network 112 may be a combination of a LAN and the Internet. In addition, network 112 may be implemented as a wired network, or a wireless network or a combination thereof. Client nodes 110 are communicatively coupled to network 112 via a network service provider or any other suitable methods known in the art.

Network Based Service Provider

Network based service provider 102 is a network addressable system that hosts a network based service accessible over network 112 to one or more users using client nodes 110. Example network based services include, an internet search engine, an e-mail service, an instant messaging service, one or more social networking websites, one or more professional networking websites, a news website, a business website, a gaming website, one or more message boards, one or more online blogs, one or more media streaming websites, one or more electronic-commerce websites, career or business networking service, and the like.

Application servers 104 may provide access to the network based services to client nodes 110. The application servers host web pages and applications implemented using Common Gateway Interface script (CGI), PHP Hyper-text Processor (PHP), Active Server Pages (ASP), Hyper Text Markup Language (HTML), Extensible Markup Language (XML), Java and the like. In some embodiments, users may register for the network based services provided by network based service provider 102. A registration and authentication server (not shown in FIG. 1) may facilitate registration of new users to the network based services, and authenticate existing users at sign-in. The registration and authentication server may use security protocols such as Secure Sockets Layer (SSL), Transport Layer Security (TLS) or GnuTLS.

Profiling system 106 maps the user to one or more famous personalities based on the commonalities between the personal information of the user and the personal information of the one or more famous persons. Profiling system 106 transmits data operative to cause client node 110 to render a structured form for input by a user, wherein the structured form comprises one or more fields into which a user can input user attribute data. Profiling system 106 receives one or more user information objects including user attribute data. Profiling system 106 then accesses a data store of famous persons. The data store includes one or more famous person information objects associated with the famous persons. Profiling system 106 then identifies one or more famous persons based on matching the user information objects with the famous person information objects. Profiling system 106 then presents the identified famous persons, and associated famous person attribute data that matches the user attribute data. Example information objects include, without limitation, a name, an age, a gender, a date of birth, a sun sign, one or more areas of interests, a location of the user, and a picture of the user.

Profiling system 106 provides an incentive to users for providing the user's personal information, by presenting the commonalities between the user and the famous persons. Such incentives may drive the user to provide additional personal information. Network based service provider 102 may then use the personal information of the users to provide lifestyle and demographic based targeted content provision. In addition to the lifestyle and demographic targeting, network based service provider 102 may also provide targeted content to the users based on behavioral targeting, and geo-targeting. Profiling system 106 is described in detail in conjunction with FIG. 2 and FIG. 3.

Application server 104 may host a user interface module. The user interface module is configured to prompt a user to input his/her personal information, and accept the personal information input by the user. The web based application is configured to return information related to famous persons based on the user's personal information. Particularly, the interface includes a plurality of information fields that are filled by the user in order to receive the information related to famous person matching the user's personal information. The plurality of information fields may be customized to have specific information fields to receive particular user information. This information may be specifically utilized in the returning the information relating to famous persons. Further, this information may be required to customize web content to be displayed to the user in future. In an embodiment of the present invention, the interface may be deployed as a pop-up window, a new tab in a web browser window, and a new window of the web browser, a banner, text in a sidebar, and the like.

Furthermore, the application server 104 receives the user's personal information and stores it in user information database 110.

Client Nodes

Client node 110 is a computing device from which a user accesses the services provided by the network based service provider 102. Client node 110 has the capability to communicate over network 112. Client node 110 further has the capability to provide the user an interface to interact with the service provided by network based service provider 102. Client node 110 may be, for example, a desktop computer, a laptop computer, a mobile phone, a personal digital assistant, and the like. Client node 110 may execute one or more client applications such as, without limitation, a web browser to access and view content over a computer network, an email client to send and retrieve emails, an instant messaging client for communicating with other users, and a File Transfer Protocol (FTP) client for file transfer. Client nodes 110, in various embodiments, may include a Wireless Application Protocol (WAP) browser or other wireless or mobile device protocol suites such as, without limitation, NTT DoCoMo's i-mode wireless network service protocol suites, EDGE, and the like.

Although FIG. 1 illustrates the foregoing systems as separate systems, the functionality represented by each system may be combined into other systems. Furthermore, the functionality represented by each depicted system may be further separated. Still further, implementations of the present invention may operate in network environments that include multiples of one or more of the individual systems and sites disclosed herein. In addition, other implementations may operate in network environments where one or more of the systems described herein have been omitted.

Profiling System

Figure 2:
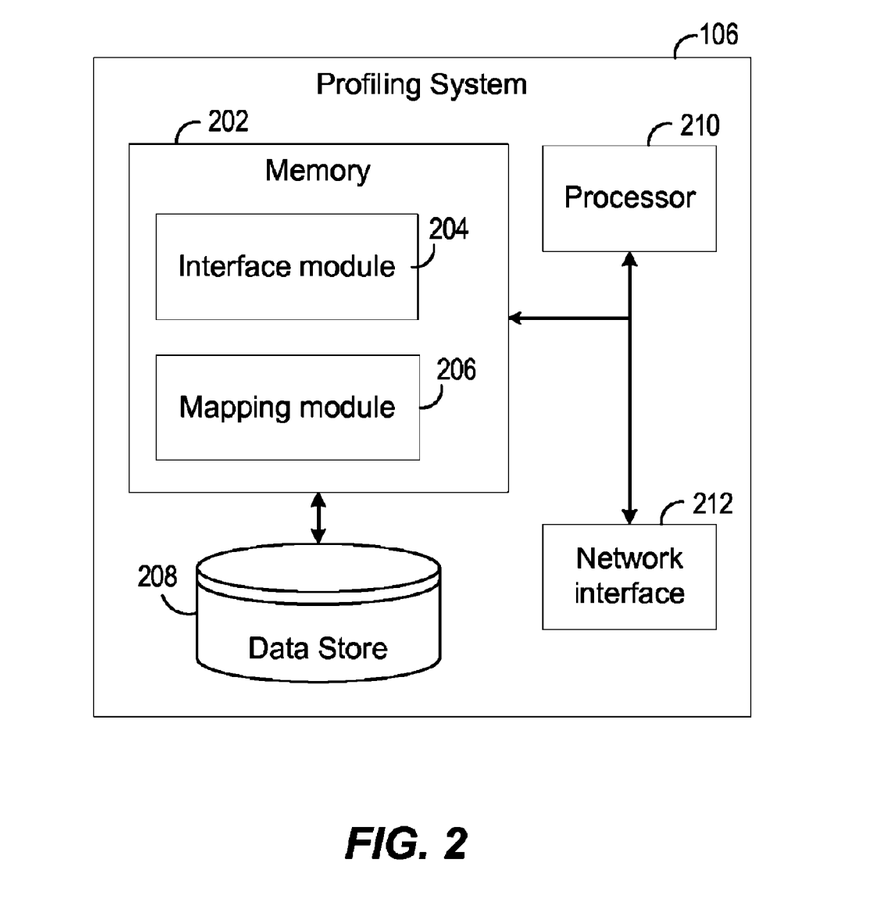
FIG. 2 illustrates an example profiling system according to one embodiment.

FIG. 2 is a simplified block diagram of a profiling system in accordance with one embodiment. Profiling system 106 includes a memory 202 that further includes an interface module 204, and a mapping module 206. Profiling system 106 also includes a data store 208. Profiling system 106 may further include one or more processors 210 and a network interface 212.

Interface module 204 is configured to receive the user information objects, and to present one or more famous persons based on a matching between one or more user information objects and one or more famous person information objects. In one example implementation, interface module 204 may be an application programming interface (API) that interworks with a user interface hosted by application server 104, and mapping module 206. Such a user interface may include an interface for prompting a user to input his personal details, an interface for accepting the user inputs, and an interface for presenting the matching famous persons to the user. Example user interfaces are described in conjunction with FIGS. 4-6. In another example implementation, interface module 204 may be a user interface configured to interact with the user, and interwork with mapping module 206.

Interface module 204 receives the user information objects from either the user interface, or directly from the user, depending on the implementation. Interface module 204 then transmits the user information objects to mapping module 206. Interface module 204 receives the identified famous persons, and the associated famous person information objects which match the user person information objects, from mapping module 206, or from data store 208, depending on the implementation. Interface module 204 then presents the identified famous persons and the associated famous person information objects. As described above, interface module 204 may host a user interface which presents the identified famous person and matching information objects to the user, or transfer the identified famous person and matching information objects to a user interface hosted by application server 104.

Upon receiving the user information objects, mapping module 206 accesses data store 208. Data store 208 includes one or more famous person information objects associated with the famous persons. Mapping module 206 may then identify one or more famous persons based on the famous person information objects matching the user information objects. Mapping module 206 may identify the famous persons based on an exact match between the user information objects and the famous person information objects. For example, mapping module 206 may identify famous persons that like the same cuisine as the user based on an exact match of the information object "favorite cuisine". Alternatively, mapping module 206 may identify the famous persons based on an approximate match between the user information objects and the famous person information objects. For example, mapping module 206 may identify famous persons that have the same sun-sign as the user based on an approximate match of the information object "date of birth".

Mapping module 206 may issue a database query to access data store 208 and to identify the famous persons. Mapping module 206 may issue separate queries for different information objects. Alternatively, mapping module 206 may group the different information objects to form a complex query. Mapping module 206 may group the different information objects using Boolean operators such as AND, OR, and NOT. Mapping module 206 includes the user information objects as fields of the query, and values of the user information objects as the values for the fields. In other words, the user information object "City" constitutes the field of the query, and "Cupertino" constitutes the value of the field. In some embodiments, mapping module 206 may also include a facial pattern matching module. The facial pattern matching module may compare the facial features of the user's photograph, with the facial features of famous persons.

Data store 208 stores the famous person information objects, associated with the famous persons. With time, more people become famous, and already famous persons may be recognized for newer achievements. Data store 208 may be updated periodically to account for such additions. Such periodic updates may include adding famous persons to data store 208, and adding associated famous person information objects to data store 208. Further, existing famous person information objects may be updated as applicable. For instance, famous person information objects related to the famous persons' interests, including favorite music, movies, TV shows, cuisine, and so forth, may be updated periodically. Still further, new famous person information objects, or previously unknown famous person information objects may be associated with existing famous persons in the periodic updates. In an example implementation, one or more human operators may update data store 208 periodically.

Data store 208 may store the famous person information objects in one of a database, a text file, a comma separated file, a tab separated file, a Java Script Object Notation file, and the like. In the database implementation of data store 208, any known database solution such as a Relational Database Management System (RDBMS), an Extensible Markup Language (XML) database, a flat file database, and the like, may be used. Data store 208 may then transmit the famous person information objects having values that match the values of the user information objects, and the identity of the famous person associated with the matching values, to interface module 204, in response to the query issued by mapping module 206.

Network based service provider 102 may retrieve the information objects associated with the famous persons from various sources such as, but not limited to, Wikipedia, on-line encyclopedias, official website of the famous person, fan websites, news websites, blogs, and the like. Network based service provider 102 may deploy crawlers to retrieve the information objects. In some implementations, human operators may editorially review the information objects, provide the names of the famous persons, and update the sources of information to be crawled for the famous person information objects.

Although FIG. 2 illustrates the foregoing systems as separate systems, the functionality represented by each system may be combined into other systems. Furthermore, the functionality represented by each depicted system may be further separated. Still further, implementations of the present invention may operate in network environments that include multiples of one or more of the individual systems and sites disclosed herein.

Process

Figure 3:
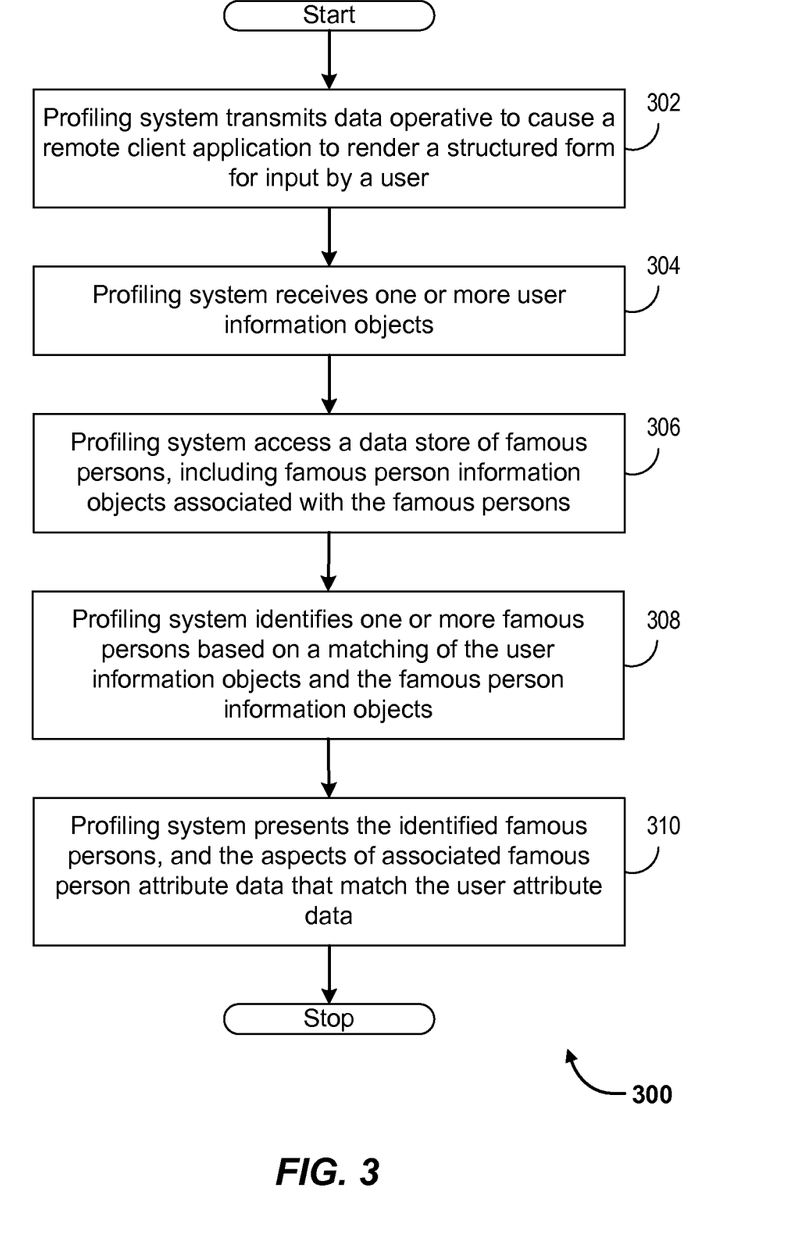
FIG. 3 is a flowchart illustrating an example method for identifying famous persons based on user information, according to one embodiment.

FIG. 3 is a flowchart illustrating an exemplary process 300 for receiving user's personal information to customize web content based on user preferences according to one embodiment.

At step 302, profiling system 106 transmits data operative to cause client node 110 to render a structured form for input by a user. The structured form comprises one or more fields into which a user can input user attribute data. Example structured forms are described in conjunction with FIGS. 4-6.

At step 304, profiling system 106 receives one or more user information objects including the user attribute data. As described above in conjunction with FIG. 2, profiling system 106 receives the one or more user information objects through a user interface that may be hosted by application server 104 or by profiling system 106. Depending on the implementation, profiling system 106 may receive the user information objects either directly from the user, or from application server 104. Examples of user information objects may include, but not limited to, a name, an age, a gender, a date of birth, a sun sign, one or more areas of interests, a location of the user, a picture of the user, and the like. However it may be apparent to a person skilled in the art that various other user information objects may be received without departing from the spirit and scope of the invention.

At step 306, profiling system 106 accesses data store 208 of famous persons. The data store may include one or more famous person information objects associated with the famous persons. Examples of famous person information object may include, but not limited to, a name, an age, a gender, a date of birth, a sun sign, one or more areas of interests, a location of the famous person, and a picture of the famous person. Profiling system 106 may access data store 208 using database queries, or search commands, depending on whether data store 208 is implemented as a database, or other data storage formats such as text files, spreadsheets, or delimiter separated value files (such as CSV, TSV, and the like). Profiling system 106 uses the user information objects as parameters to the query.

At step 308, profiling system 106 identifies one or more famous persons based on a matching of at least one of the user information objects and the famous person information objects. Profiling system 106 may identify the famous persons based on an exact match between the user information objects and the famous person information objects. For example, profiling system 106 may identify famous persons that like the same cuisine as the user based on an exact match of the information object "favorite cuisine". Alternatively, profiling system 106 may identify the famous persons based on an approximate match between the user information objects and the famous person information objects. For example, profiling system 106 may identify famous persons that have the same sun-sign as the user based on an approximate match of the information object "date of birth".

At step 310, profiling system 106 presents the identified famous persons and one or more aspects of associated famous person attribute data that matches the user attribute data. In one embodiment, profiling system 106 presents the identified famous person and matching famous person information object directly to the user through a user interface generated by profiling system 106. In another embodiment, profiling system 106 presents the identified famous persons and the associated matching information objects to a user interface hosted by application server 104. Application server 104 then renders the user interface and presents it to the user. The famous persons and the aspects of associated famous person attribute data that match the user attribute data may be presented on a separate web page, or integrated onto the same web page. Example implementations of presenting in a separate window include a pop-up window, a new tab in a web browser window, and a new window of the web browser. Example implementations of presenting on the same web page include a banner, text in a sidebar, and the like.

Presenting the identified famous persons and the aspects of associated famous person attribute data that match the user attribute data provides an incentive to the user for providing user information. In other words, the user is more likely to provide the user information when the user has a motivation, such as finding out interesting commonalities that the user shares with one or more famous persons. Network based service provider 102 may then use the user information objects for provided targeted content to the user. Targeted content may include advertisements, newsletters, and the like. Network based service provider 102 may use the user information objects in conjunction with behavioral and geo-targeting to provide targeted content to the user. Network based service provider 102 may store the received user information objects in a user information data store to facilitate future targeted content provision.

In one embodiment where the user has registered with the network based service provider 102, the user logs on to the network based service using a unique username and password assigned to the user during registration. Accordingly, network based service provider 102 identifies which user is currently entering the user information, associates the received user information objects with that user, and stores the user information objects in the appropriate locations within the user information data store. In another embodiment, where the user is not registered with the network based service provider 102, network based service provider 102 may identify the user based on one or more of an Internet Protocol (IP) address, cookies, and the like. Network based service provider 102 may then store the received user information objects in appropriate locations within the user information data store.

User Interface

Figure 4A:
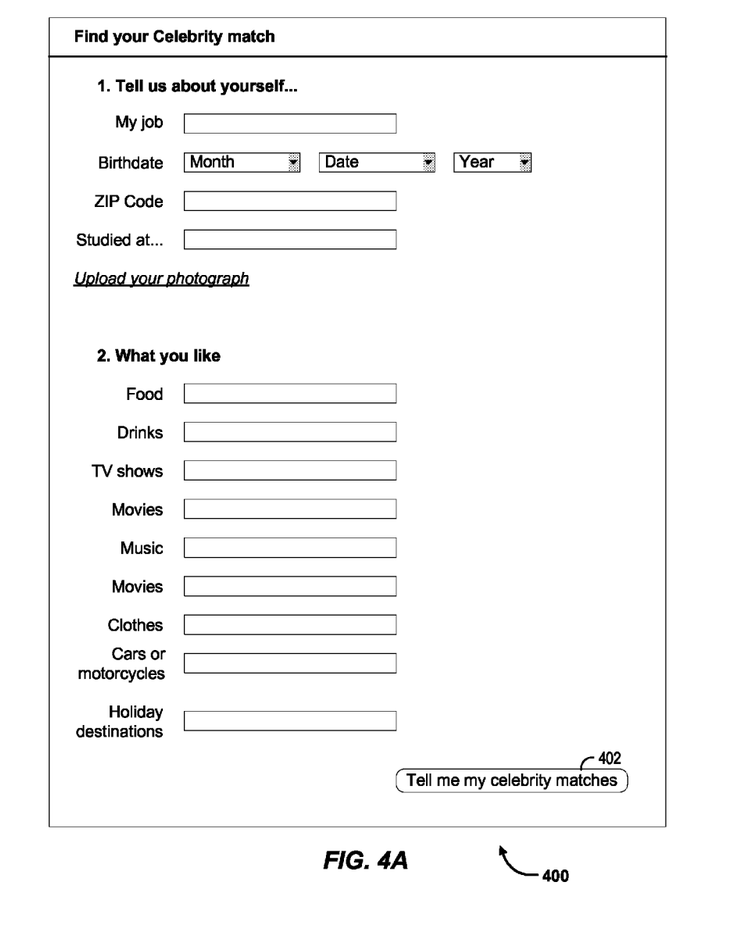
FIG. 4A illustrates an example interface for receiving user information, according to one embodiment.

FIG. 4A illustrates an example interface 400 for receiving user's personal information, according to one embodiment. Interface 400 shows an example form for entering the user information. Interface 400 includes various input fields such as, but not limited to, drop-down-boxes, radio buttons, a text boxes, a photo uploading tool and the like, for entering the user information objects. A person skilled in the art will appreciate that various other tools and buttons may be utilized to receive the user information object without departing from the spirit and scope of the invention. Interface 400 also includes a button 402 for submitting the user information objects to profiling system 106. The user may populate one or more of the text boxes and click on button 402 to view celebrity matches. Interface 400 may be presented to the user as a pop-up window, or a new tab in the browser window, or in a separate browser window. Alternatively, interface 400 may be presented to the user in the same window. Upon clicking button 402, interface 400 may also transmit the entered user information objects to a user information data store, for future targeted content provision. As described above, in conjunction with FIG. 3, network based service provider 102 may associate the user information objects with a particular user using log-in information, cookies, IP address, and so forth.

Figure 4B:
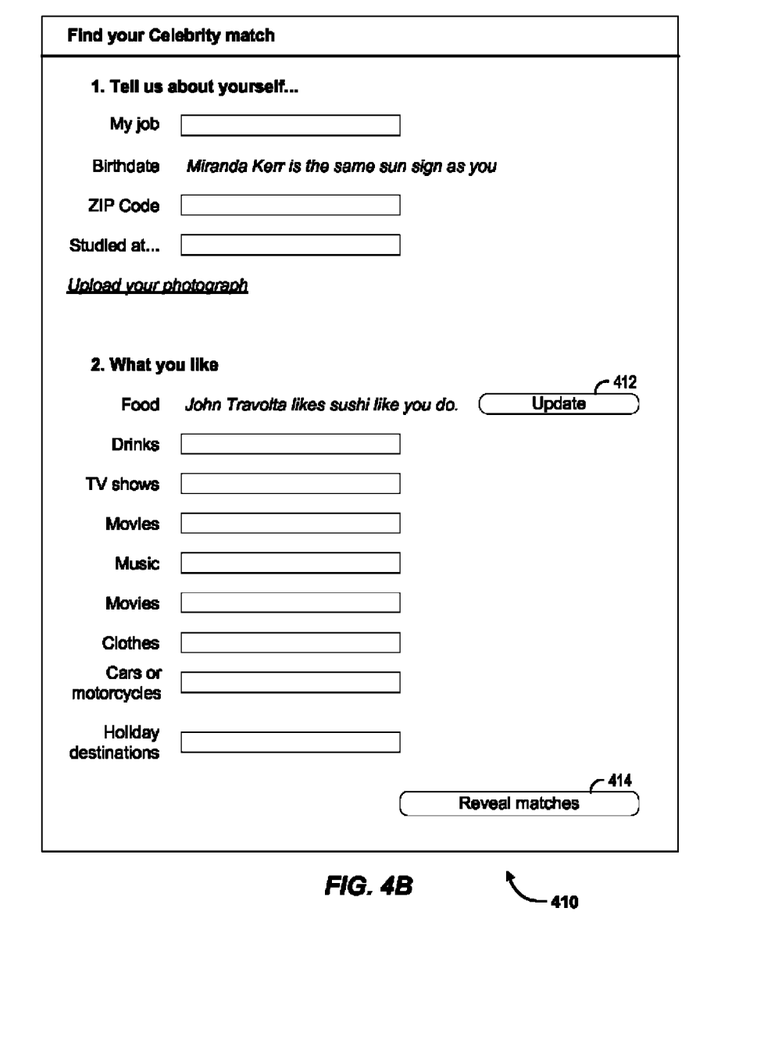
FIG. 4B illustrates an example interface for receiving user information and presenting matching famous persons according to one embodiment.

FIG. 4B illustrates an example interface 410 for presenting famous person's information and matching corresponding the user's personal information according to one embodiment. Once the user enters one or more user information objects, and clicks on button 402, interface 410 is presented to the user. Interface 410 presents the famous person matches against the user information objects. For example, when the user enters "Sushi" as his favorite "Food", profiling system 106 identifies "John Travolta" as the famous person having the same "Food" information object as the user. Thus, the text box for "Food" is replaced with the match result. Interface 410 also includes a button 412 to update the user information objects already submitted by the user. The user may click on button 412 to add, or remove user information objects. Interface 410 also includes a button 414 to reveal additional matches with famous persons based on additional user information objects submitted by the user. For example, if the user now populates the text box corresponding to "Movies", and clicks on button 414, profiling system 106 may refresh interface 410, to replace the text box with the famous person match for the information object "Movies". On clicking button 414, interface 410 may also transmit the entered user information objects to a user information data store, for future targeted content provision. As described above, in conjunction with FIG. 3, network based service provider 102 may associate the user information objects with a particular user using log-in information, cookies, IP address, and so forth.

Figure 5A:
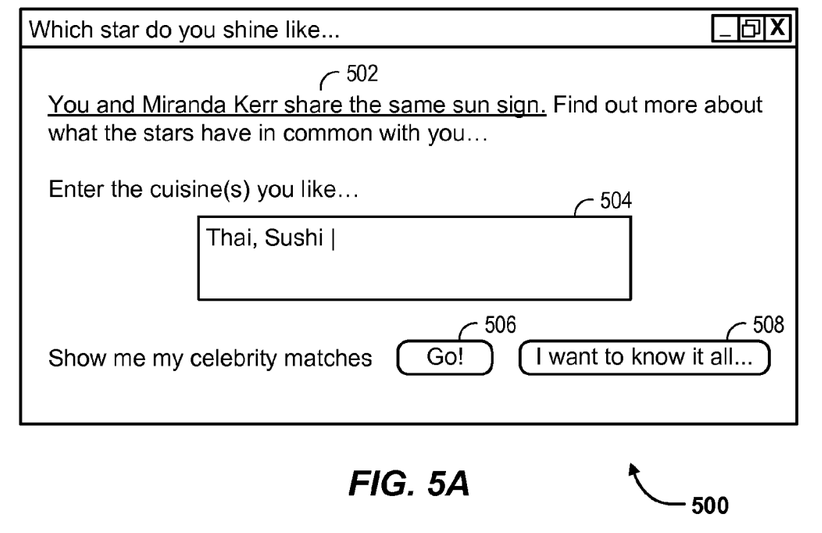
FIG. 5A illustrates an example interface for receiving user information and presenting matching famous persons according to one embodiment.
Figure 5B:
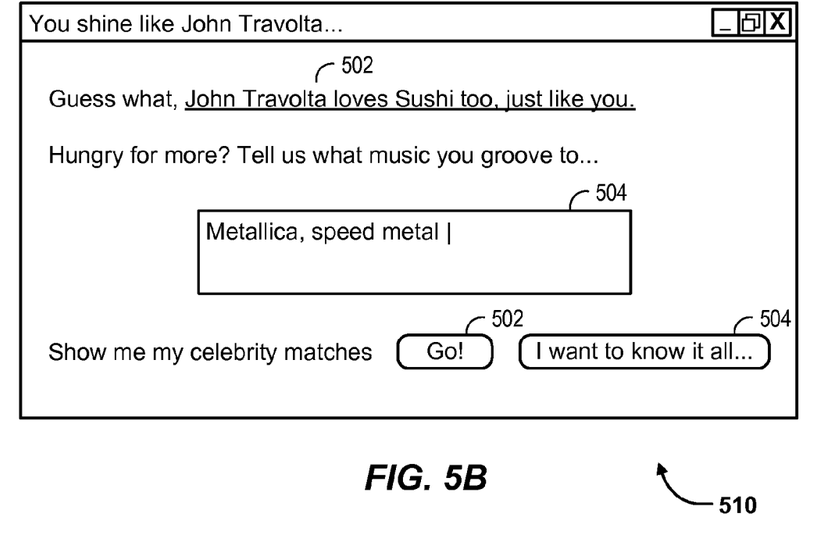
FIG. 5B illustrates an example interface for receiving user information and presenting matching famous persons according to one embodiment.

FIG. 5A illustrates an example interface 500 for receiving the user information objects according to one embodiment. Interface 500 includes a preview 502 of the famous person matches, based on the user information objects already know to profiling system 106. For example, interface 500 presents the preview "You and Miranda Kerr share the same sun sign. Find out more about what the stars have in common with you . . . " Such user information objects may either be received during registration of the user, or received during a previous presentation of interface 500. Interface 500 further includes a text box 504 for entering an additional user information object. Interface 500 includes a button 506 for submitting the additional user information object to profiling system 106, and a button 508 to navigate to an interface such as interface 400, or interface 410. Clicking on button 506 submits the user information object entered in text box 504 to network based service provider 102, and refreshes the interface 500 to display an interface 510 as shown in FIG. 5B. Such a preview-and-prompt interface may provide an interactive experience to the user.

Figure 6:
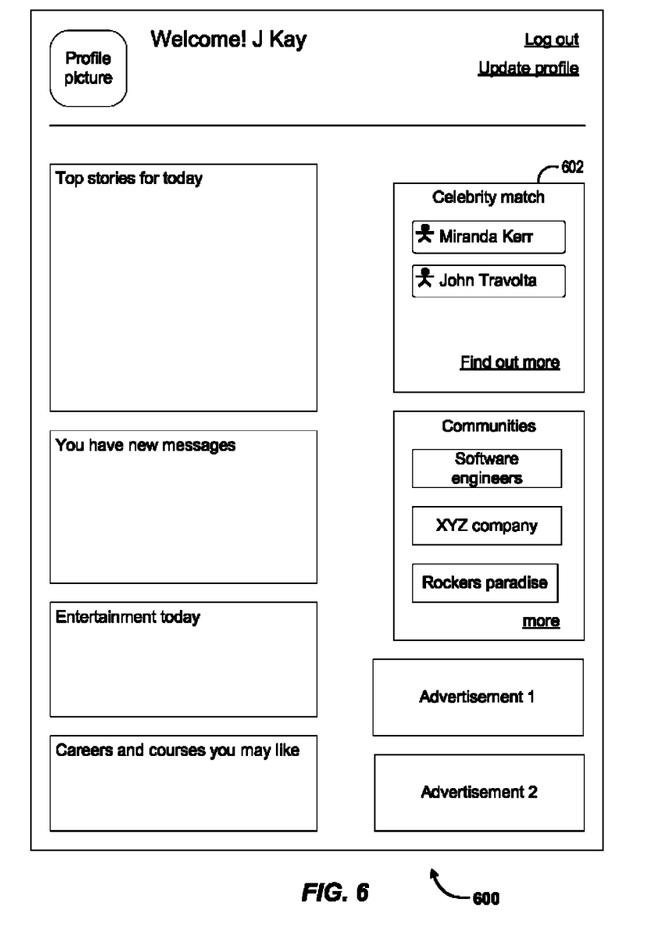
FIG. 6 illustrates an example interface for presenting matching famous persons and targeted content according to one embodiment.

FIG. 6 illustrates an example interface 600 for presenting the famous person matches to the user, according to one embodiment. Interface 600 includes a famous person match area 602, a news area, a message alert area, an entertainment schedule area, an interest area, a online communities area, and one or more advertisement areas. The news area, the entertainment schedule area, and the advertisement areas may include targeted content relevant to the user, based on the user information objects previously provided by the user. The famous person match area displays the famous persons having information objects matching the user information objects in accordance with the matching criteria defined by profiling system 106. Clicking on the famous person buttons may present a user interface such as interfaces 500, and 510. Clicking on the "Find out more" link may present a user interface such as interfaces 400, and 410.

Example Hardware System Architecture

Figure 7:
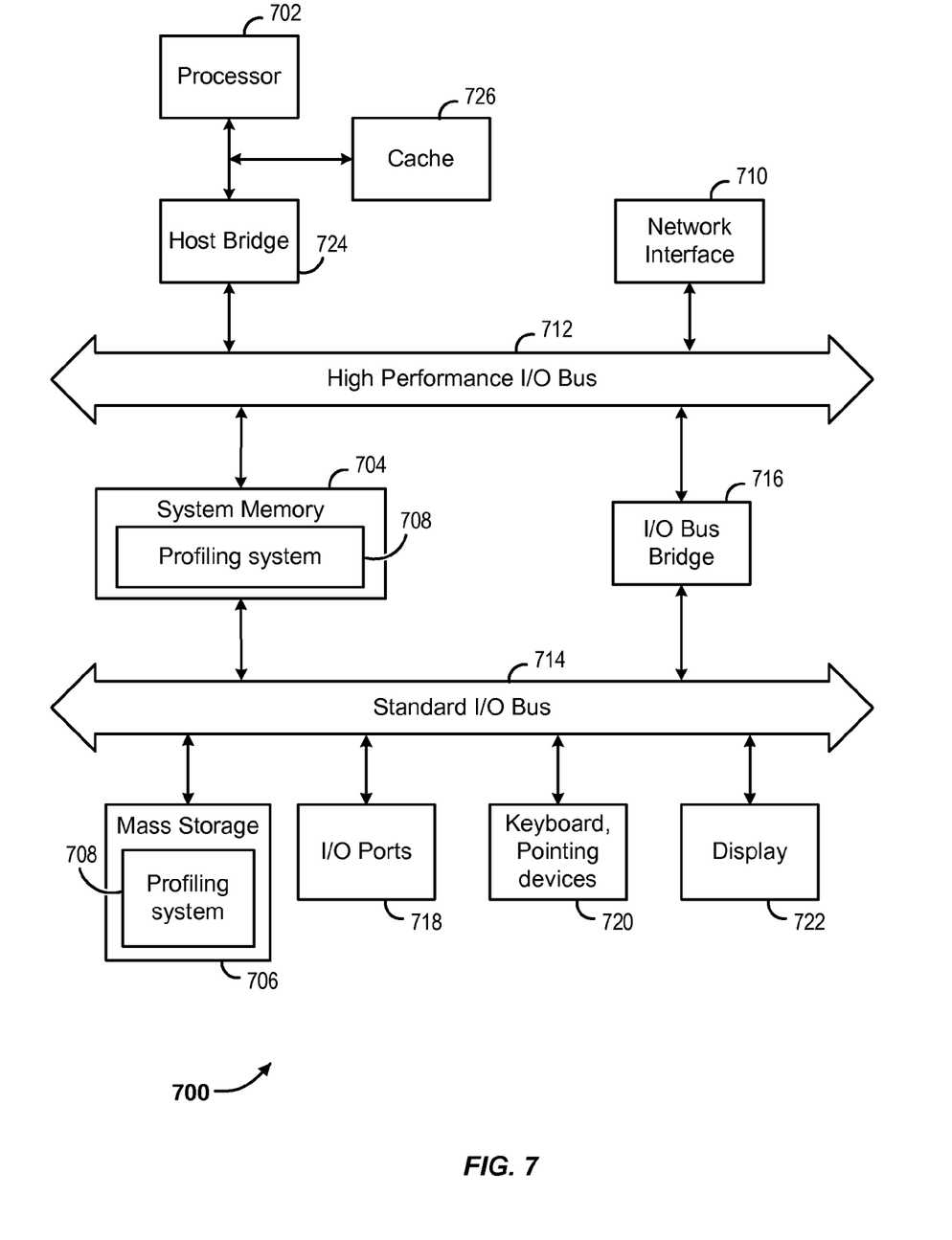
FIG. 7 is a schematic diagram illustrating an example computing system for receiving user's personal information to customize web content based on user preferences according to one embodiment.

FIG. 7 illustrates an example hardware system 700 for implementing profiling system 106 according to one embodiment. Hardware system 700 includes at least one processor 702, a system memory 202, and mass storage 706. The system memory 202 has stored therein one or more application software, programming instructions 708 for implementing profiling system 106, an operating system and drivers directed to the functions described herein. Mass storage 706 provides permanent storage for the data and programming instructions 708 for profiling system 106, whereas system memory 202 (e.g., DRAM) provides temporary storage for the data and programming instructions when executed by processor 702. The process flow of the programming instructions 708 for profiling system 106 is described in detail in conjunction with FIG. 3. In on embodiment, user information database 110 may reside in mass storage 706. A network/communication interface 710 provides communication between hardware system 700 and any of a wide range of networks, such as an Ethernet (e.g., IEEE 802.3) network, etc. Additionally, hardware system 700 includes a high performance input/output (I/O) bus 712 and a standard I/O bus 714. System memory 202 and network/communication interface 710 couple to bus 712. Mass storage 706 couple to bus 714. I/O Bus Bridge 716 couples the two buses 712 and 714 to each other.

In one embodiment, the process 300 described herein is implemented as a series of software routines run by hardware system 700. These software routines comprise a plurality or series of instructions to be executed by a processor in a hardware system, such as processor 702. Initially, the series of instructions are stored on a storage device, such as mass storage 706. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 710. The instructions are copied from the storage device, such as mass storage 706, into system memory 202 and then accessed and executed by processor 702.

In one embodiment, hardware system 700 may also include I/O ports 718, a keyboard and pointing device 720, a display 722 coupled to bus 712. I/O ports 718 are one or more serial and/or parallel communication ports that provide communication between additional peripheral devices, which may be coupled to hardware system 700. A host bridge 724 couples processor 702 to high performance I/O bus 710. Hardware system 700 may further include video memory (not shown) and a display device coupled to the video memory. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

Hardware system 700 may include a variety of system architectures; and various components of hardware system 700 may be rearranged. For example, cache 726 may be on-chip with processor 702. Alternatively, cache 726 and processor 702 may be packed together as a "processor module," with processor 702 being referred to as the "processor core." Furthermore, certain embodiments of the present invention may not require nor include all of the above components. For example, the peripheral devices shown coupled to standard I/O bus 712 may couple to high performance I/O bus 710. In addition, in some embodiments only a single bus may exist with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Server operating system, available from Microsoft Corporation of Redmond, Wash., the Apple Macintosh Operating System, available from Apple Computer Int. of Cupertino, Calif., UNIX operating systems, and the like.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method comprising:
transmitting, from a server, data operative to cause a remote client application to render a structured form for input by a user, wherein the structured form comprises one or more fields into which a user can input user attribute data;

receiving, at the server, one or more user information objects including the user attribute data;

accessing a data store of famous persons, wherein the data store comprises one or more famous person information objects each associated with a famous person, wherein the famous person information objects include famous person attribute data;

identifying one or more famous persons based on a matching of at least one of the one or more user information objects and the one or more famous person information objects;

presenting the identified famous persons and one or more aspects of associated famous person attribute data that matches the user attribute data; and providing targeted content to the user, based on the one or more user information objects, wherein the user information objects comprises at least one of a name, an age, a gender, a date of birth, a sun sign, one or more areas of interests, a location of the user, and a picture of the user, and wherein presenting the identified famous persons and associated famous person information objects comprises presenting in one of a pop-up window, a new tab in a web browser window, and a new web browser window, and a current web browser window.

2. The method of claim 1, wherein the targeted content comprises at least one of an advertisement and a news item.

3. The method of claim 1, further comprising storing the one or more user information objects in a user information data store.

4. The method of claim 1 wherein presenting the identified famous persons and associated famous person information objects comprises presenting at least one of an image, text, a Flash object, and a Java object.

5. The method of claim 1 wherein receiving the one or more user information objects comprises receiving using one of an online form including a plurality of form fields, and a single form field.

6. A system for processing information, the system comprising:
  one or more network interfaces;
  at least one processor;
  a memory; and
  computer program code stored in a computer readable storage medium, wherein the computer program code, when executed, is operative to cause the at least one processor to:
    transmit data operative to cause a remote client application to render a structured form for input by a user, wherein the structured form comprises one or more fields into which a user can input user attribute data;
    receive one or more user information objects including the user attribute data;
    access a data store of famous persons, wherein the data store comprises one or more famous person information objects each associated with a famous person, wherein the famous person information objects include famous person attribute data;
    identify one or more famous persons based on a matching of at least one of the one or more user information objects and the one or more famous person information objects;
    present the identified famous persons and one or more aspects of associated famous person attribute data that matches the user attribute data; and
    provide targeted content to the user, based on the one or more user information objects,
    wherein the user information objects comprises at least one of a name, an age, a gender, a date of birth, a sun sign, one or more areas of interests, a location of the user, and a picture of the user, and
    wherein presenting the identified famous persons and associated famous person information objects comprises presenting in one of a pop-up windows, a new tab in a web browser window, and a new web browser window, and a current web browser window.

7. The system of claim 6, wherein the targeted content comprises at least one of an advertisement and a news item.

8. The system of claim 6, wherein the computer program code, is further operative to store the one or more user information objects in a user information data store.

9. The system of claim 6, wherein the computer program code, is further operative to present the identified famous person and associated famous person information objects in at least one of an image, text, a Flash object, and a Java object.

10. The system of claim 6, wherein the computer program code, is further operative to receive the one or more user information objects using one of an online form including a plurality of form fields, and a single form field.

11. A tangible, non-transitory computer-readable medium encoded with computer-executable instructions, the computer-executable instructions, when executed, operable to cause at least one processor to:
  transmit data operative to cause a remote client application to render a structured form for input by a user, wherein the structured form comprises one or more fields into which a user can input user attribute data;
  receive one or more user information objects including the user attribute data; access a data store of famous persons, wherein the data store comprises one or more famous person information objects each associated with a famous person, wherein the famous person information objects include famous person attribute data;
  identify one or more famous persons based on a matching of at least one of the one or more user information objects and the one or more famous person information objects;
  present the identified famous persons and one or more aspects of associated famous person attribute data that matches the user attribute data; and
  provide targeted content to the user, based on the one or more user information objects,
  wherein the user information objects comprises at least one of a name, an age, a gender, a date of birth, a sun sign, one or more areas of interests, a location of the user, and a picture of the user, and
  wherein presenting the identified famous persons and associated famous person information objects comprises presenting in one of a pop-up window, a new tab in a web browser window, and a new web browser window, and a current web browser window.

12. The computer-readable medium of claim 11, wherein the targeted content comprises at least one of an advertisement and a news item.

13. The computer-readable medium of claim 11, wherein the computer-executable instructions are further operative to cause the at least one processor to store the one or more user information objects in a user information data store.

14. The computer-readable medium of claim 11, wherein the computer-executable instructions are further operative to cause the at least one processor to present the identified famous person and associated famous person information objects in at least one of an image, text, a Flash object, and a Java object.

15. The computer-readable medium of claim 11, wherein the computer-executable instructions are further operative to cause the at least one processor to receive the one or more user information objects using one of an online form including a plurality of form fields, and a single form field.

\* \* \* \* \*